United States Patent
Magnussen

(10) Patent No.: US 7,782,182 B2
(45) Date of Patent: Aug. 24, 2010

(54) METHOD AND SYSTEM FOR DEMONSTRATING DISCREPANCIES IN SPEEDOMETERS IN VEHICLES

(75) Inventor: Per Magnussen, Bergen (NO)

(73) Assignee: Modulprodukter AS, Bergen (NO)

(*) Notice: Subject to any disclaimer, the term of this patent is extended or adjusted under 35 U.S.C. 154(b) by 159 days.

(21) Appl. No.: 11/921,886

(22) PCT Filed: Jun. 2, 2006

(86) PCT No.: PCT/NO2006/000206
§ 371 (c)(1),
(2), (4) Date: Dec. 6, 2007

(87) PCT Pub. No.: WO2006/132538
PCT Pub. Date: Dec. 14, 2006

(65) Prior Publication Data
US 2008/0197991 A1    Aug. 21, 2008

(30) Foreign Application Priority Data
Jun. 7, 2005    (NO) .................................... 20052749

(51) Int. Cl.
*B60Q 1/00* (2006.01)
(52) U.S. Cl. .................. 340/441; 340/501; 340/517; 340/936
(58) Field of Classification Search .......... 340/441, 340/461, 438, 466, 444; 701/1, 104, 99, 701/110, 201; 324/160, 161, 166; 702/96, 702/142, 148
See application file for complete search history.

(56) References Cited

U.S. PATENT DOCUMENTS

| | | | |
|---|---|---|---|
| 4,945,753 A | | 8/1990 | Twombly |
| 5,546,799 A | * | 8/1996 | Parker ..................... 73/170.11 |
| 5,569,848 A | | 10/1996 | Sharp |
| 5,636,145 A | * | 6/1997 | Gorman et al. ............ 702/148 |
| 5,949,330 A | * | 9/1999 | Hoffman et al. ........... 340/438 |
| 6,016,458 A | | 1/2000 | Robinson et al. |
| 6,353,796 B1 | | 3/2002 | Schipper et al. |
| 6,801,838 B2 | * | 10/2004 | Park .............................. 701/1 |

FOREIGN PATENT DOCUMENTS

JP    54162580 A    12/1979

* cited by examiner

Primary Examiner—Toan N Pham
(74) Attorney, Agent, or Firm—Abelman, Frayne & Schwab

(57) ABSTRACT

The invention relates to a method and a system to demonstrate discrepancies in the speedometer of a vehicle. In a preferred embodiment, the method and the system further comprise the possibility of adjusting or calibrating the speedometer with the use of demonstrated discrepancies automatically or after approval by the user. The speed of the vehicle is measured with an external measuring device and the information about the speed is sent to a receiver in the vehicle. By comparing received information about speed with information of speed according to the speedometer of the vehicle information about possible discrepancies is made available to a user.

19 Claims, 1 Drawing Sheet

METHOD AND SYSTEM FOR DEMONSTRATING DISCREPANCIES IN SPEEDOMETERS IN VEHICLES

BACKGROUND AND PRIOR ART

The present invention relates to a method and a system for showing discrepancies in speedometers in vehicles.

A number of methods, systems and procedures to calibrate or adjust speedometers in vehicles, for example cars, are known. One way to adjust a speedometer is to place the car on rollers that are connected to a measuring apparatus, whereupon the speedometer can be adjusted according to the measurement. This control is often used if the speedometer is destroyed or there is a suspicion of a large discrepancy.

However, most cars have a discrepancy where the speedometer is adjusted down. This means, for example, that the real speed of the car can be 95 km/h when the speedometer indicates 100 km/h. This is done deliberately by car manufacturers to avoid claims for compensation from drivers that are fined because of speedometers being adjusted too high.

The discrepancy will only be larger when the tires of the car are worn. When the profile in a tire with a diameter of 60 cm is worn by 3 mm, the circumference becomes 18.8 mm smaller. At a speed of 100 km/h, this means a discrepancy of about 1 km/h. A speedometer of a car with a standard discrepancy of 5 km/h and rather worn tires will therefore indicate that the speed of the car is 94 km/h.

Cars with excessive discrepancies in the speedometer can cause dangerous traffic situations. For example, it can be irritating for someone driving behind a car that drives too slowly, something that can lead to dangerous overtaking situations.

Another disadvantage with this is that one can feel that the speed limit on the actual stretch of road is too low in relation to, for example, the width of the road, number of lanes, bends, vegetation by the side of the road, and other factors that influence the driver's feeling for speed. The driver will not risk speeding fines and sticks to the speed limit, at least according to the speedometer, while he/she would, in reality, be a more relaxed driver if the speed had been a few kilometres per hour higher. In reality, the driver could be able to drive a little bit faster without breaking the speed limit. With a speedometer with too a large discrepancy, the driver goes slower than what is felt to be natural, and must therefore look at the speedometer all the time, something that takes his attention from the road and the traffic. This can clearly lead to dangerous situations.

For the last disadvantage, there are systems that can be set at a certain speed. Some systems, such as automatic speed controllers or cruise control systems; keep the car at a given speed, until the driver brakes or accelerates. Other systems emit a signal when a predetermined maximum speed is exceeded, for example, a voice signal, sound signal or light signal. However, such systems contribute to a certain degree only, as all such systems that the present inventor is aware of use the speed measuring device of the car as a basis.

Claim 28 of U.S. Pat. No. 6,353,796 B1 describes a device for calibration of a speedometer or a distance measuring system of a vehicle. The system estimates a driven distance with the use of, for example, GPS (Global Positioning System), GLONASS (Global Navigation Satellite System) or LORAN (Long Range Navigation), which estimate the distance used to calculate an estimated speed of a vehicle, which in turn can be used to calibrate the speedometer. The problem with this and similar systems is that they are complex and expensive, that it requires at least two, but preferably many, points where the measuring takes place to be able to calculate an estimated speed that is sufficiently accurate to be useful.

It is the intention to solve the above mentioned problems with the present invention.

SUMMARY OF THE INVENTION

The method and the system according to the present invention are characterised by the characteristic parts of the main claims 1 and 7.

Alternative embodiments are described in the dependent claims.

BRIEF DESCRIPTION OF THE DRAWING

A preferred embodiment of the system shall now be described with the help of the enclosed FIG. 1.

DETAILED DESCRIPTION OF THE PREFERRED EMBODIMENTS

Figure 1:
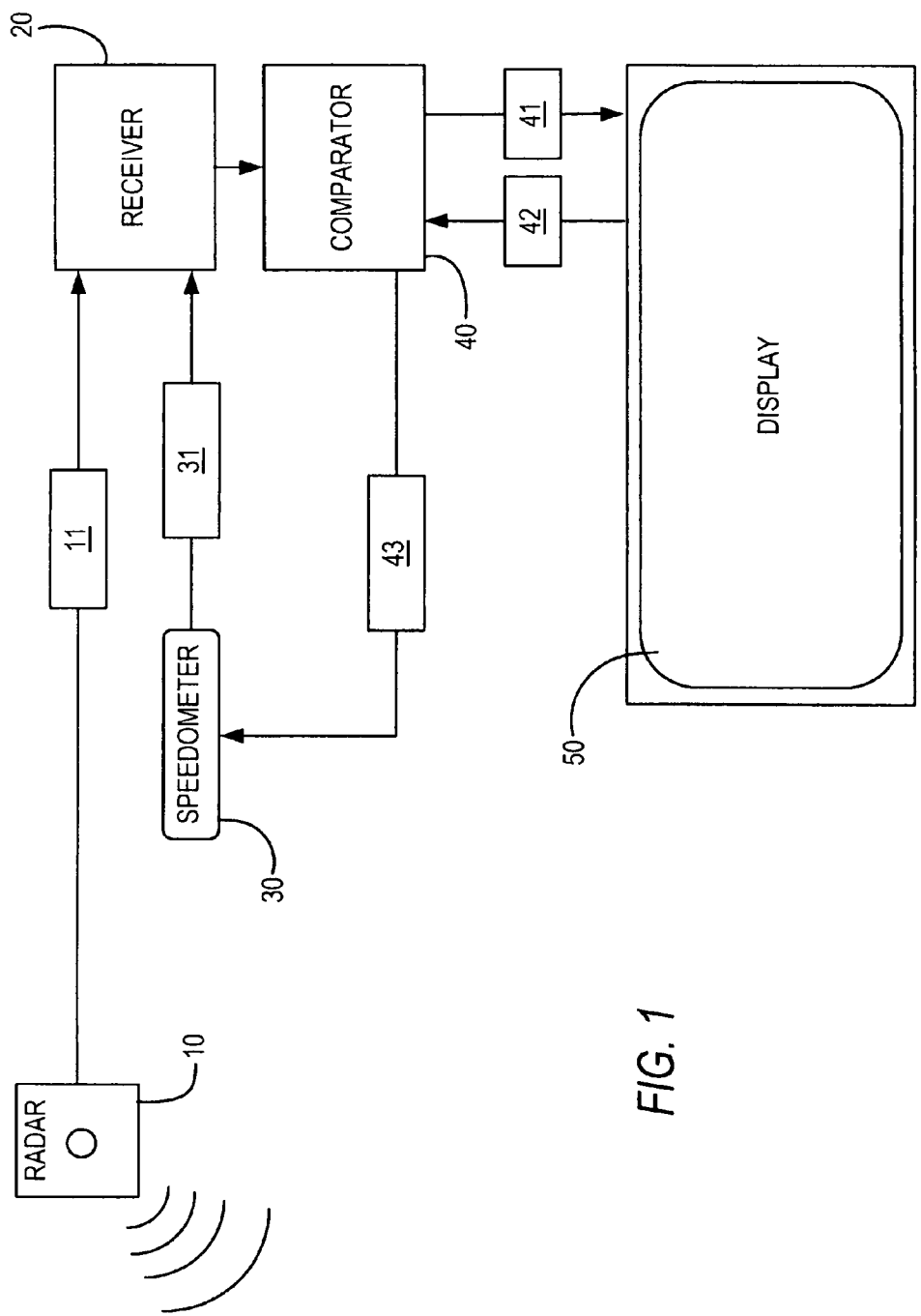

The FIGURE shows schematically a speed measuring device 10 that can be a radar measuring point. The speed measuring device measures the speed of, for example, a car at 94 km/h, and sends this information as indicated by information box 11 in FIG. 1 to a receiver 20 in the car. The measurement is further sent to a comparator device 40. The speedometer 30 of the car measures a speed of 99 km/h, and sends this information as indicated in information box 31 to the comparator device 40 also. In the comparator device, it is calculated that the difference between the externally measured speed and the speed measured by the speedometer in the car is +5 km/h as indicated by information box 41, ergo, the speedometer of the car indicates 5 km/h more than the real speed. The discrepancy is made known to the driver with the help of a screen or Display 50. A question of whether the driver wishes to adjust the speedometer of the car to the correct speed or not can come up on the screen as "−5 km/hr, Adjust OK?". If the driver chooses to adjust the speedometer his instruction "OK" is indicated in information box 42 sent to the comparator FIG. 1. The comparator device 40, or any other digital or analogue adjustment unit, dependent on whether the speedometer is digital or analogue, sends an appropriate signal as indicated by information box 43 and thereby adjusts the speedometer, possibly with a set discrepancy upwards to still have a small safety margin, which is, however, smaller than the measured and calculated discrepancy. In the example shown, the speedometer is adjusted down from 99 km/h by 5×0.95 km/h, i.e. to 94.25 km/h, while the real speed is 94 km/h. This means that the discrepancy of the speedometer is corrected from +5.3% to +0.27%.

For the speed measuring device 10 to be able to transmit speed information to the correct car, it can be advantageous that every car is given a unique ID, such as a reference number. This ID can be transmitted from the speed measuring device 10 to the receiver 20 in the car just before, during or just after the speed measurement, and can be stored temporarily in the speed measuring device and/or the car's receiver. Another variant is a measuring point (electronic loop) in the road that sends out an ID to the speed measuring device and to the car's receiver. When the speed measuring device has completed the task of measuring the respective vehicle, speed information is sent together with associated ID form the speed measuring device 10 to the receiver 20 in the vehicle. The vehicle can then carry out a comparison of its ID with the received ID and if there is an agreement, no calculation of discrepancy is carried out. In most cars, there is a connection between speedometer and the trip counter. When the discrepancy of the speedometer is on the average 5%, the total distance driven for the car will consequently deviate by 5%. When one shall sell a used car, this discrepancy will mean 5000 km per 100 000 km. Thus one can cross psychologically important borders at the sale of a car. A car that shows it has done 97 000 km will be sold easier than a car that shows it has done 102 000 km.

In an alternative embodiment of the invention, it can be put in when the tires of the car are changed, and also possibly the dimensions of the tires and the depth of the profile. The system can, using two or more discrepancy determinations calculated over a given one or more time periods, calculate when the profile of the tires begins to be worn, and warn the driver about this.

The user can preferably set in a value, where all received discrepancies below this value are not repeated to the user. This is to avoid unnecessarily disturbing the user when driving.

Furthermore, it can be set in that the user does not get information about any possible discrepancies before she/he stops the car. It can then be displayed after stopping the vehicle, when and where the receiver received a measured value and then the user can choose whether the speedometer shall be adjusted according to the estimated discrepancy.

In another preferred system, the driver of the vehicle will not get information about calculated discrepancy, but this will be checked by a car mechanic every time the car is being serviced. A double check can then be carried out at the garage, for example, with the help of a roller bench.

If the user has adjusted the speedometer as the car tires get worn, this must be inserted in the system when new tires are being fitted, so that the system can calculate a new value for the correct speed, or so that the system can zero the settings of the speedometer to the values when delivered from the factory.

It must be emphasised that a system according to the present invention should preferably be approved by the authorities in different countries or regions. Permanent measuring points along the road, for example radar points, should be calibrated accurately for the system to function well. It may be that measuring points that send information to the car at the same time send information on when it was calibrated, by which department, possibly with how many percent accuracy it measures, possibly a kind of digital signature to authenticate that it is an approved calibration point, or other information that can contribute to the system functioning as reliably and accurately as possible.

The invention claimed is:

1. A method for demonstrating a discrepancy in the speedometer in a vehicle, where a speed according to said vehicle speedometer is compared with a vehicle speed information from a second measuring device, and for adjusting the vehicle speedometer to a corrected speed based on a measured speed discrepancy, comprising and where said vehicle has a unique ID, the steps:
  a) measuring the speed of the vehicle with a speed measuring device that is external of and not physically coupled to any part of said vehicle,
  b) continuously sending said measured information about speed from an external measuring device to a receiver in the vehicle,
  c) comparing said information of speed received from the external measuring device with the information of speed according to the speedometer of the vehicle,
  d) making available said information about any speed discrepancy to a vehicle user, and adjusting the speedometer to correct for said any discrepancy,
  e) using the information about said discrepancy to calculate wear on tires of said vehicle by comparing the discrepancy of the speedometer, and
  f) carrying out a calculation of said discrepancy only when said unique ID associated with said vehicle, agrees with an ID transmitted from said external measuring device.

2. The method according to claim 1, comprising transmitting of said ID from the speed measuring device to a vehicle receiver just before, during or after the speed measurement, and temporarily storing of said ID in the speed measuring device and/or the vehicle receiver.

3. The method according to claim 1, comprising emitting said ID from a measuring point (electronic loop) in the road to the speed measuring device and to the vehicle receiver, and when the speed measuring device has completed measuring the respective vehicle, sending the speed information together with associated ID from the speed measuring device to the vehicle receiver, and then the receiver makes a comparison of its ID with the received ID and if there is an agreement, carrying out the speed comparison, and if there is no agreement, no calculation of discrepancy is carried out.

4. A method for demonstrating to a vehicle user a discrepancy between a speed indicated by a speedometer in a vehicle with the speed indicated by a second speed measuring device that is external and independent of said vehicle, comprising the steps:
  a) measuring the speed of said vehicle with a speed measuring device that is external of said vehicle and producing externally measured speed information,
  b) sending said externally measured speed information from said external speed measuring device to a receiver in said vehicle,
  c) with a comparator comparing said externally measured speed information with the information of speed according to the speedometer of said vehicle, and
  d) making available to said vehicle user said information about any said speed discrepancy.

5. The method according to claim 4 comprising the further step of using the information about said discrepancy to calculate wear on tires of said vehicle.

6. The method according to claim 4 comprising the further step of adjusting said speedometer to a corrected speed based upon said measured speed discrepancy.

7. The method according to claim 4 wherein said external measuring device is a radar device.

8. The method according to claim 4, comprising adjusting said speedometer with a set speed discrepancy upwards to still have a safety margin, which is smaller than the measured and calculated discrepancy.

9. The method according to claim 4, comprising making available said information about any said discrepancy by presenting corresponding information on a display screen, a mechanical pointer, a measuring clock, or other indicating device.

10. The method according to claim 4, wherein said vehicle has a unique ID that can be sensed by said second speed measuring device, said method comprising the step of carrying out a calculation of said discrepancy only when said unique ID associated with said vehicle, agrees with an ID transmitted from said external measuring device.

11. The method according to claim 10, comprising transmitting of said ID from said external speed measuring device to a vehicle receiver just before, during or after the speed measurement, and temporarily storing of said ID in said speed measuring device and/or the vehicle receiver.

12. The method according to claim 10, comprising emitting said ID from a measuring point (electronic loop) in a road to said external speed measuring device and to the vehicle receiver, and when said external speed measuring device has completed measuring the speed of the respective vehicle, sending the speed information together with associated ID from the speed measuring device to the vehicle receiver, and the receiver adapted to make a comparison of its ID with the received ID, and if there is an agreement, to carry out the speed comparison, and if there is no agreement, adapted to not calculate any discrepancy.

13. The method according to claim 4 where said vehicles comprise cars, motorbikes, mopeds and boats.

14. A system for demonstrating to a vehicle user a discrepancy between the speed indicated by a speedometer of a vehicle with the speed indicated by a second speed measuring device that is external and independent of said vehicle, comprising:
- a) a speedometer in said vehicle,
- b) a receiver and comparator in said vehicle,
- c) the second speed measuring device that is external and independent of said vehicle, and includes a transmitter to send information about said speed from said external device to said receiver in said vehicle, said comparator adapted to compare said speed information from said speedometer with said speed information from said external speed measuring device and to produce information on any discrepancy between said speed information, and
- d) a device in said vehicle to make information about possible discrepancies available to said user of said vehicle.

15. The system according to claim 14, wherein said external measuring device is a radar device.

16. The system according to claim 14, characterised in that the information about any said discrepancy is made available by information on a display screen, a mechanical pointer, a measuring clock, or other indicating device.

17. The system according to claim 14, characterised in that said display screen is situated in a panel in the middle of a steering wheel of said vehicle, and where the panel is stationary with respect to a dashboard of said vehicle so that the panel does not alter its position when the steering wheel is turned.

18. The system according to claim 17, characterised in that said display panel further comprises a screen to show information about an operation and setting of the system.

19. The system according to claim 18, where said display screen is a touch-screen type, where operating buttons of the system constitute icons on the screen.

* * * * *